Figure 1:
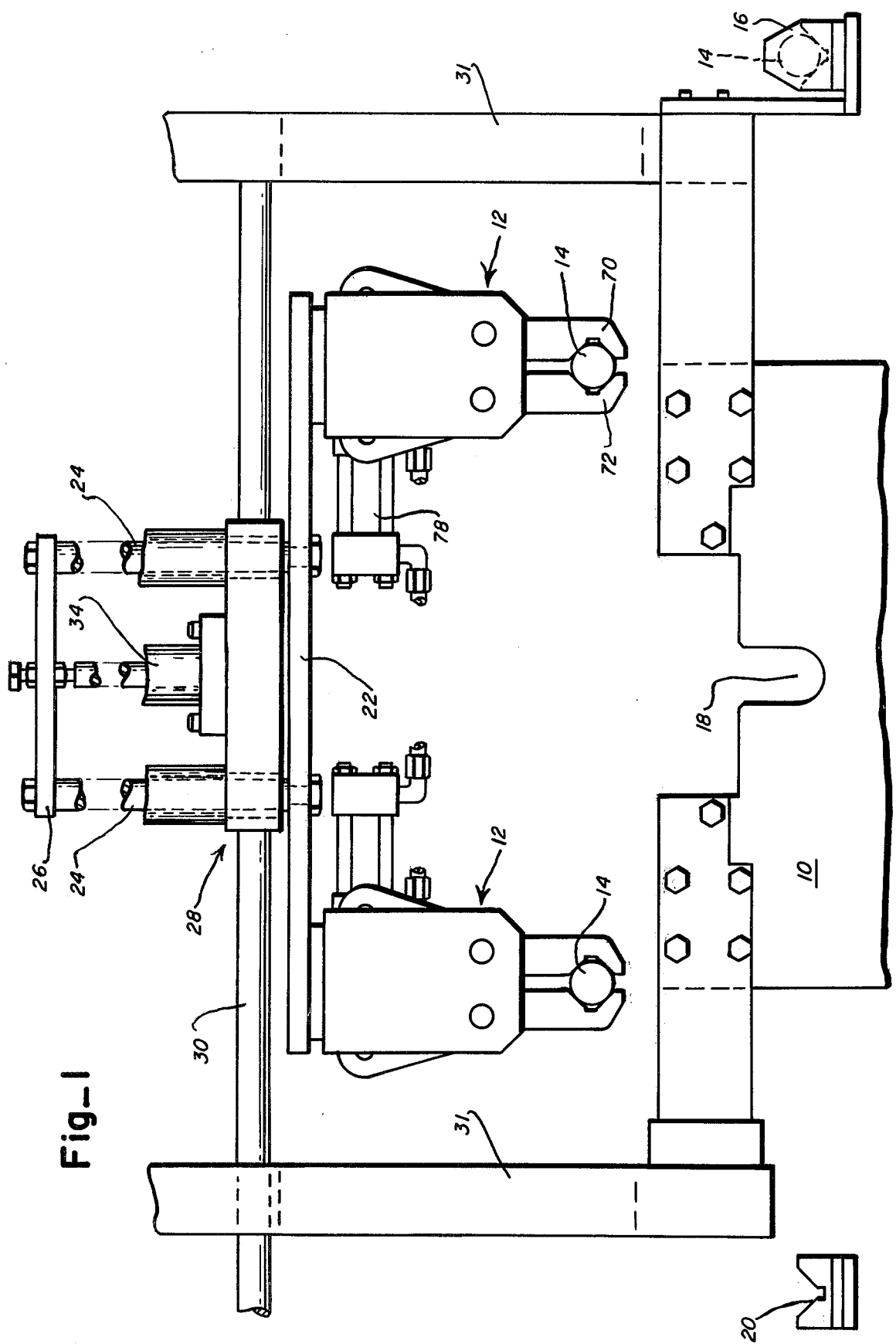

United States Patent [19]

D'Aloisio

[11] 4,343,590
[45] Aug. 10, 1982

[54] LOADER FOR A MACHINE TOOL
[75] Inventor: Elio F. D'Aloisio, East Hartford, Conn.
[73] Assignee: Litton Industrial Products, Inc., New Britain, Conn.
[21] Appl. No.: 188,056
[22] Filed: Sep. 17, 1980
[51] Int. Cl.$^3$ .............................................. B65G 37/00
[52] U.S. Cl. ..................................... 414/753; 294/88; 294/106; 414/226
[58] Field of Search ................ 414/731, 753, 225–226, 414/739, 744 A; 294/103 R, 113, 88, 115, 106; 198/486, 653, 694–696

[56] References Cited
U.S. PATENT DOCUMENTS 1,933,225 10/1933 Smith ................................... 414/753
3,147,993 9/1964 Broderson et al. .............. 294/106 X
3,258,136 6/1966 Rockstrom et al. ................. 414/226

Primary Examiner—Robert B. Reeves
Assistant Examiner—Douglas D. Watts
Attorney, Agent, or Firm—Spencer T. Smith

[57] ABSTRACT

A loader for a machine tool comprising horizontal track means, shuttle means mounted on the track means for relative horizontal displacement, support means including rigidly secured top, front and back walls, the front and back walls each including a pair of horizontally spaced bores, a pair of shafts selectively sized for insertion into the bores, and means for releasably securing the shafts to the front and back walls to define the bottom wall of the support means, gripper assembly means including first and second gear means each having a central bore for matingly receiving one of the shafts, first and second gripper arm means each having a bore for matingly receiving one of the shafts, means for rigidly securing the first and second gear means to the first and second gripper arm means, respectively, hydraulic cylinder means having a housing including coaxial boss means extending outwardly from the front and back walls thereof and having a selectively advanceable rod means, the first gripper arm means further including a slot at one end, means for pivotally connecting the end of the rod means to the slotted end of the first arm, the second gripper arm means including, first and second portions defining a slotted end, each including a bore for receiving one of the bosses and, means for releasably securing the first portion of the second portion, and means for mounting the support means on the shuttle means for relative vertical displacement.

4 Claims, 2 Drawing Figures

LOADER FOR A MACHINE TOOL

To automate the flow of workpieces through a machine tool, a loading mechanism is often integrated with the machine tool to deliver unmachined workpieces to and remove machined workpieces from the machine tool.

Such loaders often include a pair of workpiece handling mechanisms which operate in unison to simultaneously deliver and remove workpieces to and from the machine tool.

It is an objected of the present invention to provide an improved loader for integration with a machine tool.

Other objects and advantages of the present invention will become apparent from the following portion of the specification and from the accompanying drawings which illustrate, in accordance with the mandate of the patent statutes, a presently preferred embodiment incorporating the principles of the invention.

Figure 2:
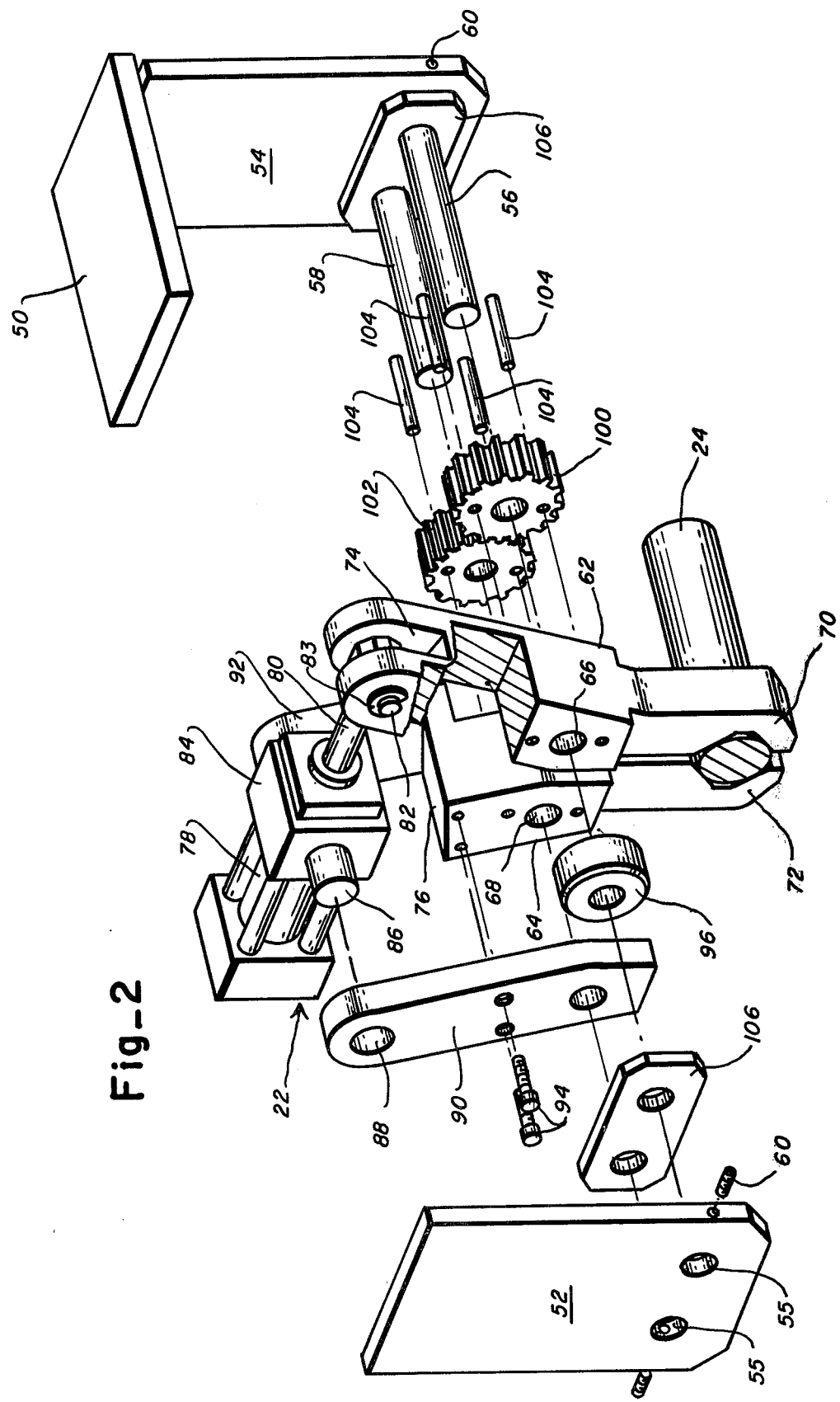

Referring to the drawings:

FIG. 1 is an elevated view of a machine tool having a gripper assembly transferring workpieces; and FIG. 2 is an exploded, perspective view of the loader gripper gripping a workpiece according to the teachings of the present invention.

The loader, which is secured to the base 10 of a machine tool includes a pair of gripper assemblies 12 which transfer workpieces 14 between a load station 16, the work station 18 of the machine tool and an unload station 20. The gripper assemblies 12 are secured to a horizontal support member 22 which is suspended, via guide rods 24, from the horizontal tie bar 26 of the loader shuttle 28. The shuttle is mounted for horizontal displacement on rails 30 (only one is shown) which are rigidly supported by vertical supports 31 having suitable openings for allowing for passage of the gripper assemblies 12 therethrough.

A hydraulic cylinder 34 mounted on the tool shuttle controls the vertical positioning of the horizontal tie bar 26 to locate the gripper assemblies 12 at selected upper or lower positions.

Each loader assembly 12 has a support housing 50 having parallel side walls 52 and 54 which support in suitable openings 55 two parallel shafts 56 and 58 which are maintained in position by set screws 60. Two gripper arms 62 and 64, each having a central bore 66 and 68 are matingly positioned on the shafts 56 and 58 for pivotal rotation thereon. The gripper arms include lower jaw portions 70 and 72 for gripping a workpiece 14 and upper slotted portions 74 and 76. A hydraulic cylinder 78 having a piston rod 80 and a housing 84 extends between and is pivotally connected to the upper gripper arm portions within these slots. The piston rod is pivotally mounted on a pin 82 which is maintained in position by locking clips 83. Laterally extending housing bosses 86 are contained within apertures 88 defined in the upper portion of the second gripper arm 64. The second gripper arm 64 is comprised of two pieces 90 and 92 pivotally supported on the shaft 58 and secured together by screws 94. A spacer 96, which is pivotally supported on the other shaft 56, makes the axial dimension of both gripper arms along these shafts the same. The rod 80 is advanced to open the jaws 70 and 72 and is retracted to close the jaws to grip a workpiece. A firm and powerful grip is created by the piston because the upper portions of the arms provide leverage to the jaws 70 and 72.

Gears 100 and 102 are mounted on the gripper arms 62 and 64 concentrically about the shafts 56 and 58 in operative association using pins 104 or other conventional means. Gears 100 and 102 assure reciprocative action between the arms 62 and 64 and an even, self-centering grip.

In the preferred embodiment, spacers 106 are provided to separate the arm mechanism from the walls 52 and 54 of the support housing 50 and are dimensioned so that only a nominal amount of clearance is present on the shafts 56 and 58.

What is claimed is:

1. A loader for a machine tool comprising:
horizontal track means,
shuttle means mounted on said track means for relative horizontal displacement,
support means including
rigidly secured top, front and back walls, said front and back walls each including a pair of horizontally spaced bores,
a pair of shafts selectively sized for insertion into said bores, and
means for releasably securing said shafts to said front and back walls to define the bottom wall of said support means,
gripper assembly means including
first and second gear means each having a central bore for matingly receiving one of said shafts,
first and second gripper arm means each having a bore for matingly receiving one of said shafts,
means for rigidly securing said first and second gear means to said first and second gripper arm means, respectively,
hydraulic cylinder means having a housing including coaxial boss means extending outwardly from the front and back walls thereof and having a selectively advanceable rod means,
said first gripper arm means further including a slot at one end,
means for pivotally connecting the end of said rod means to the slotted end of said first arm,
said second gripper arm means including,
first and second portions defining a slotted end, each including a bore for receiving one of said bosses and,
means for releasably securing said first portion to said second portion, and
means for mounting said support means on said shuttle means for relative vertical displacement.

2. A loader for a machine tool according to claim 1, wherein said front and back wall means each include a wall and spacer means having bores therein for receiving said shafts for defining a spacing between said gripper assembly means and said wall.

3. A loader for a machine tool according to claim 2, wherein said spacer means is selectively axially sized for preventing axial displacement of said gripper assembly means.

4. A loader for a machine tool according to claim 1 or 3, further comprising a cylindrical shim having a bore thereinfor receiving said first shaft, said shim having an axial width selected to be equal to the width of the first portion of said second gripper arm means.

* * * * *